United States Patent [19]

Petz

[11] 4,408,787
[45] Oct. 11, 1983

[54] SYSTEM FOR CONNECTING THE EDGE AREAS OF THIN-WALLED BODIES

[76] Inventor: Günter Petz, Flachslander St. 8, D 8500 Nürnberg, Fed. Rep. of Germany

[21] Appl. No.: 199,345

[22] Filed: Oct. 21, 1980

[30] Foreign Application Priority Data

Jan. 28, 1980 [CH] Switzerland ............................ 641/80

[51] Int. Cl.³ .................................................. F16L 23/00
[52] U.S. Cl. ...................................... 285/305; 285/406; 403/335; 403/364
[58] Field of Search ............... 285/406, 405, 424, 305; 403/335, 364, 159

[56] References Cited

U.S. PATENT DOCUMENTS

| | | | |
|---|---|---|---|
| 877,534 | 1/1908 | Vanvactor | 138/158 |
| 1,267,313 | 5/1918 | Cook | 285/406 X |
| 1,771,167 | 7/1930 | Dolan | 285/424 X |
| 2,590,720 | 3/1952 | Mayer | 403/335 X |
| 2,753,962 | 7/1956 | McBerty | 403/335 X |
| 2,858,582 | 11/1958 | Toulmin, Jr. | 403/364 X |
| 2,868,565 | 1/1959 | Suderow | 285/406 X |
| 3,672,709 | 6/1972 | Mueller | 285/424 X |
| 3,737,180 | 6/1973 | Hayes, Jr. et al. | 285/373 X |
| 3,982,779 | 9/1976 | Hickey | 285/373 X |
| 4,219,081 | 8/1980 | Howe | 403/364 X |

FOREIGN PATENT DOCUMENTS

| | | | |
|---|---|---|---|
| 2129034 | 12/1972 | Fed. Rep. of Germany | 285/424 |
| 1238801 | 7/1960 | France | 285/305 |
| 196340 | 1/1978 | German Democratic Rep. | 403/364 |

*Primary Examiner*—Thomas F. Callaghan
*Attorney, Agent, or Firm*—Bacon & Thomas

[57] ABSTRACT

A system for connecting corresponding edge areas of adjacent thin-walled bodies. Each edge area is provided with at least one bent notch portion which engages a corresponding bent notch portion carried by the other edge area, such that apertures provided in the notched portions are coaxially aligned to receive a common connecting member for securing the bodies together. A plurality of such notch portions may be spaced along the lengths of the corresponding edge areas to define a series of coaxial apertures through which an elongate connecting member is inserted for securing the bodies together.

16 Claims, 11 Drawing Figures

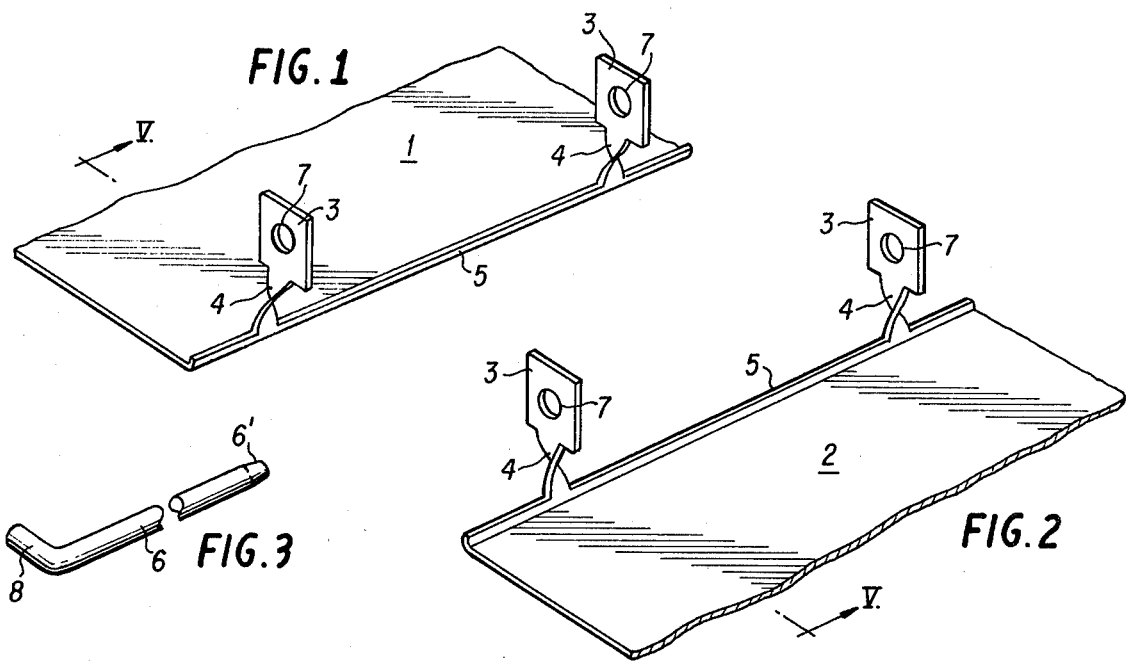
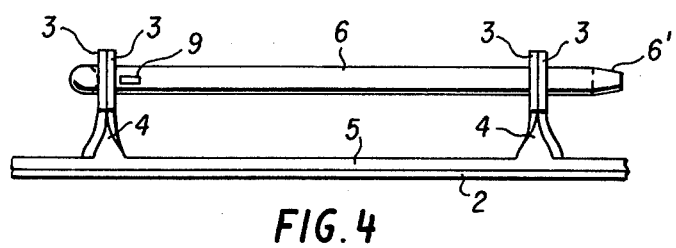
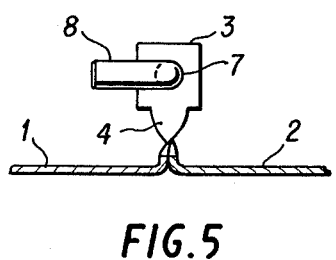
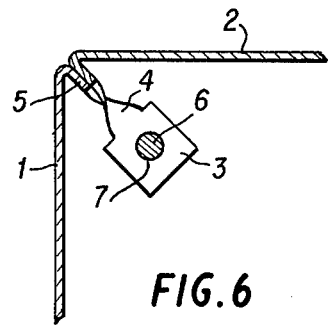

SYSTEM FOR CONNECTING THE EDGE AREAS OF THIN-WALLED BODIES

BACKGROUND OF THE INVENTION

1. Field of the Invention

The present invention is generally directed to arrangements for connecting thin-walled bodies together. In particular, the invention relates to an improved system for connecting adjacent edge areas of thin-walled bodies.

2. Description of the Prior Art

It is known to connect thin-walled bodies together by providing holes in adjacent edge areas thereof and using fasteners in the form of screws or rivets. However, the formation of holes in the edge areas and the assembly of connectors, such as screws or the like, require considerable manufacturing outlay and effort. Moreover, difficulties are often encountered when screws or the like are used to secure together thin-walled bodies in the form of narrow or high housings.

SUMMARY OF THE INVENTION

The present invention comprises a connection system for thin-walled bodies wherein corresponding adjacent edge areas to be connected together are provided with corresponding notch portions having apertures therethrough whereby when the corresponding notched portions are engaged together, the apertures are coaxially aligned for insertion of an elongate connector member therethrough. Rapid disassembly of the connected bodies is achieved by removing the connector member from the aligned apertures, thereby causing disengagement of the corresponding notched portions.

It is therefore an object of the invention to provide a simple and efficient system for connecting thin-walled bodies together.

It is another object of the invention to provide an economical system for connecting thin-walled bodies together in such a manner as to provide a visually pleasing and secure connection.

These and other objects and advantages of the invention will become apparent to those skilled in the art by reference to the following description of the preferred embodiments thereof when taken in conjunction with the accompanying drawings wherein like reference characters refer to like elements throughout the views.

BRIEF DESCRIPTION OF THE DRAWINGS

FIG. 1 is a fragmentary perspective view of a thin-walled body provided with two notch portions on its edge area;

FIG. 2 is a fragmentary perspective view of another thin-walled body provided with two corresponding notch portions on its edge area for connection to the body of FIG. 1;

FIG. 3 is a fragmentary perspective view of a member for connecting the thin-walled bodies of FIGS. 1 and 2;

FIG. 4 is a side view depicting an assembled connection system according to the invention;

FIG. 5 is a view taken along the line V—V of FIGS. 1, 2 and 3 in an assembled condition;

FIG. 6 is a cross-sectional view of thin-walled bodies having corner sections connected together by the invention;

DETAILED DESCRIPTION OF THE PREFERRED EMBODIMENTS

Figure 7:
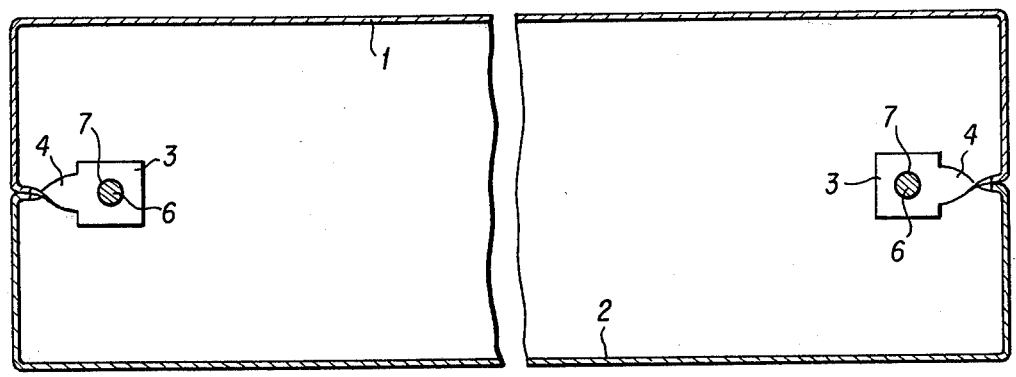
FIG. 7 is a partial cross-sectional view depicting thin-walled bodies in the form of two rectangular half-shells connected together according to the invention.

The present invention provides a system whereby thin-walled bodies can be quickly connected together and disassembled by merely inserting and removing a connecting member. The connection joints realized by this system exhibit smooth and even exterior abutting edges, particularly when the engaged corresponding notch portions and connecting member are disposed interiorly of the housing defined by the connected bodies. It is therefore not necessary to utilize cover strips or the like for concealing the abutting edges of the connection joint.

A secure, tip-free connection is assured when each of the bodies is provided with at least two notch portions on its edge area for corresponding engagement with a similar number of notch portions on the edge area of the other body. Two notch portions on one body having either the same or different spacing with respect to two corresponding notch portions of the other body have proven to be advantageous in the practice of the invention. With this system wherein there is a different spacing, the notch portions of one body can engage between the notches of the other body, thereby providing support to achieve a solid connection between the bodies. It is further understood that any number of corresponding notch portions can be provided on the respective bodies to be connected.

The insertion of the connecting member can be facilitated if the apertures of at least the lead notch portions on one end of a series of notch portions are provided with oblique or tapered surfaces defining insertion bevels on either side thereof. The connector member may be in the form of a rod provided with a tapered end to facilitate the insertion of same through the aligned apertures. Moreover, the rod may also be provided with a bent end which functions as a stop when the rod has been fully inserted through all aligned apertures and to also assure that the rod is secured in its fully inserted position, particularly when the apertures are vertically oriented. The rod may also be provided with deformations along its length to abut against and maintain itself against the notch portions.

The connecting system of the invention can be used to connect thin-walled bodies disposed in the same single plane or at angles to each other in different planes. The connector member may be rod-shaped bodies made of spring or elastic material or flexible elastic bodies which may be bent to connect notch portions disposed in a curved path. Thus, this system can therefore be used with both smooth or bent bodies, such as for the connection of body parts and vehicle construction, in tube construction, for covering or packing machines, in for erecting heating and ventilation equipment in any housing application. Moreover, the invention can be utilized in construction, such as for the connection of rod covering plates.

As seen in FIGS. 1–3, a pair of thin-walled bodies 1 and 2 are disposed in the same plane, with each body being provided with a pair of notch portions 3 which are supported on twisted strip-shaped cross pieces 4 carried by bent edge corners 5. Each notch portion 3 is provided with an aperture 7 which is coaxially aligned with the corresponding aperture of the other notch portion.

When bodies 1 and 2 are brought together with edge areas 5 adjacent each other, the two pairs of corresponding notch portions 3 engage each other so that all four apertures 7 are disposed in coaxial alignment to permit a connecting member 6, in the form of a rod or wire, to be inserted therethrough. The assembly of bodies 1 and 2 with member 6 is shown in FIGS. 4 and 5.

The forward end of member 6 may be provided with a conical taper 6' to facilitate insertion of same through aligned apertures 7. Member 6 may also be provided with a bent portion 8 at its opposite end to serve as a stop when member 6 has been fully inserted through all aligned apertures 7. The bent portion 8 prevents body 6 from falling through aperture 7 in certain vertical orientations of notch portion 7. Bent portion 8 also serves as a handle to facilitate the insertion process. As seen in FIG. 4, member 6 may be provided with a deformation 9 in the form of an abutment or the like which engages notch portion 3 to secure and prevent inadvertent removal of member 6 from its secured position.

Figure 10:
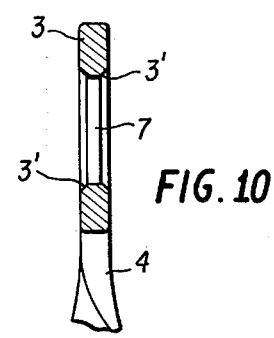
FIG. 10 is a partial cross-sectional view of a single notch portion depicting insertion bevels on both sides of the aperture.

As shown in FIG. 10, notch portion 3 may be provided with conical or inwardly tapered faces 3' on either side of aperture 7 to define insertion bevels for facilitating the insertion of member 6 therethrough.

Referring to FIG. 6, bodies 1 and 2 are shown disposed next to each other at right angles with interengaged notch portions 3 which are connected to each other by a rod 6 inserted through aligned apertures 7. In this configuration, notch portions 3 are supported by cross pieces 4 carried on bent edge corners 5 of bodies 1 and 2.

Bodies 1 and 2 comprising half-shells which collectively define a substantially rectangular ventilator housing are shown in FIG. 7. Corresponding pairs of notch portions 3 are engaged on both sides of bodies 1 and 2 to provide two sets of aligned apertures 7 through which a pair of rods 6 are inserted to secure bodies 1 and 2 together.

Figure 8:
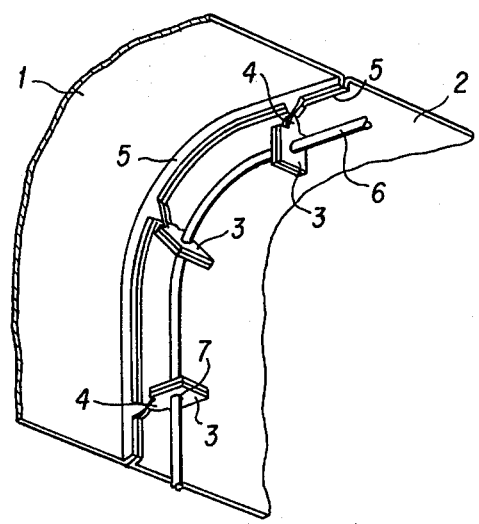
FIG. 8 is a partial perspective view showing two curved portions of corresponding thin-walled bodies connected together by the invention.

FIG. 8 depicts another embodiment of the invention wherein bodies 1 and 2 are defined by curved portions having corresponding curved edge areas 5. Notch portions 3 of bodies 1 and 2, while coaxially aligned, define a curved path through which a flexible or elastic rod 6, in the form of a helical spring or the like, may be inserted for securing bodies 1 and 2 together.

Figure 9:
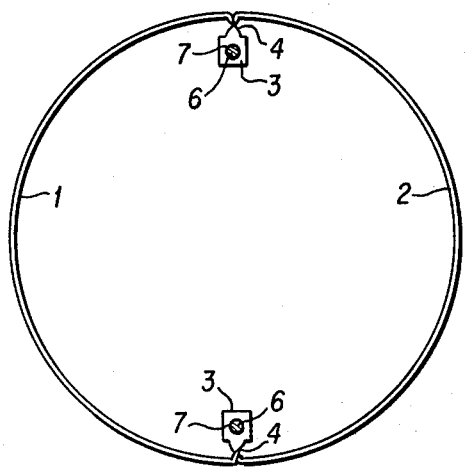
FIG. 9 is a cross-section of two hemicylindrical-shaped thin-walled bodies connected together by the system of the invention.

Thin-walled bodies 1 and 2 in the form of hemi-cylindrical shells are shown in FIG. 9 secured together interiorly on opposite sides by passing a pair of connector members 6 through aligned apertures 7 defined by the two corresponding sets of notch portions 3.

Figure 11:
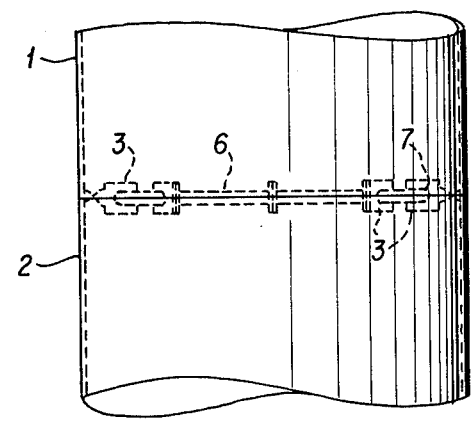
FIG. 11 is a partial view of two tubular-shaped thin-walled bodies connected end-to-end according to the invention.

As seen in FIG. 11, bodies 1 and 2 are in the form of tubular members connected end-to-end through the system of the invention. The end of each body 1 and 2 is provided with corresponding notch portions 3 around the periphery thereof to engage with corresponding notch portions 3 provided on the periphery of the end of the other body. Because of the circular path defined by the coaxially aligned apertures 7, a connector member 6 in the form of a spring elastic rod-shaped member is utilized for insertion through aligned apertures 7 to connect bodies 1 and 2 together. In this embodiment, it is preferable that rod-shaped body 6 be provided with a deformation 9 for securing itself in its assembled position.

It is to be understood that the forms of the invention herein shown and described are to be taken as preferred examples of the same, and that various changes in shape, size and arrangement of parts may be resorted to, without departing from the spirit of the invention of scope of the subjoined claims.

I claim:

1. A system for connecting adjacent thin-walled bodies to each other comprising:
    (a) each body including a bent edge area disposed transversely thereto;
    (b) a plurality of staggered notch portions having apertures therethrough carried by each bent edge area for engagement with a plurality of corresponding staggered notch portions having apertures therethrough carried by the adjacent bent edge area, with the notch portions of both bent edge areas being configured for interlaced engagement with each other at free ends thereof;
    (c) when the corresponding notch portions are in interlaced engagement with each other, the apertures are disposed in coaxial alignment, with the notch portions extending in a row successively to each other and the joined bodies define an interior joint side and an exterior joint side, wherein:
        i. the notch portions are disposed on and visible only from the interior joint side; and
        ii. the exterior joint side presents a linear joint defined by abutting portions of the bent edge areas; and
    (d) an elongate member for insertion through the aligned apertures to secure the bodies together.

2. The system of claim 1 wherein the bent edge area of each body carries at least two notch portions, with the spacing between the notch portions of the one bent edge area being different from the spacing between the notch portions of the corresponding bent edge area.

3. The system of claim 1 wherein each bent edge area carries at least two notch portions, with the spacings between the notch portions of the bent edge areas being the same.

4. The system of claim 1, 2 or 3 wherein each notch portion is connected to its corresponding bent edge area by a strip-shaped member.

5. The system of claim 4 wherein each strip-shaped member has a 90° twist therein.

6. The system of claims 1, 2 or 3 wherein each bent edge area is disposed at an angle of approximately 90° with respect to its corresponding body.

7. The system of claims 1 or 2 wherein the aperture of at least one notch portion is inwardly tapered on both sides thereof to facilitate insertion of the elongate member.

8. The system of claim 1 wherein the elongate member includes a tapered free end for facilitating insertion of the member through the apertures.

9. The system of claim 1 wherein the elongate member includes a bent end for terminating insertion of the member.

10. The system of claim 1 wherein the elongate member includes an abutment on the surface thereof for securing the member within the apertures.

11. The system of claim 1 wherein the bodies are in part defined by two planar sections which form a 90° corner joint when the notch portions are secured together.

12. The system of claim 1 wherein the bodies are each a half-shell of substantially rectangular configuration.

13. The system of claim 1 wherein the bodies are each curved and define a curved joint between.

14. The system of claim 1 wherein the bodies are each semicylindrical in configuration.

15. The system of claim 1 wherein the bodies are each tubular in configuration.

16. The system of claim 1 wherein the elongate member is made of flexible material.

* * * * *